US008292713B2

(12) United States Patent
Reynolds et al.

(10) Patent No.: US 8,292,713 B2
(45) Date of Patent: Oct. 23, 2012

(54) ASYNCHRONOUS INTERACTIVE GAME PLAY

(75) Inventors: Robert Brian Reynolds, Lutherville, MD (US); Aaron Paul Foster, Towson, MD (US); Daniel Edward Halka, Baltimore, MD (US); Douglas Francis Kaufman, Whitehall, MD (US); Paul Eugene Stephanouk, Stewartstown, PA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,798

(22) Filed: Sep. 26, 2011

(65) Prior Publication Data
US 2012/0094765 A1  Apr. 19, 2012

Related U.S. Application Data

(63) Continuation of application No. 12/904,722, filed on Oct. 14, 2010.

(51) Int. Cl.
*G06F 17/00* (2006.01)
(52) U.S. Cl. .............................. 463/9; 463/40
(58) Field of Classification Search ................... 463/42, 463/40, 9–14
See application file for complete search history.

(56) References Cited

U.S. PATENT DOCUMENTS

| 2007/0265043 | A1* | 11/2007 | Wang et al. ........................ 463/2 |
| 2008/0176655 | A1* | 7/2008 | James et al. ..................... 463/42 |
| 2010/0004055 | A1 | 1/2010 | Gormley et al. |
| 2010/0160038 | A1* | 6/2010 | Youm et al. ...................... 463/29 |
| 2010/0197410 | A1* | 8/2010 | Leen et al. ....................... 463/42 |
| 2011/0053688 | A1* | 3/2011 | Crawford et al. ................ 463/31 |
| 2011/0107239 | A1* | 5/2011 | Adoni et al. ................... 715/757 |
| 2011/0165945 | A1* | 7/2011 | Dickins ........................... 463/42 |
| 2011/0212783 | A1* | 9/2011 | Dale et al. ........................ 463/42 |
| 2011/0223996 | A1* | 9/2011 | Yerli et al. ....................... 463/36 |
| 2011/0281638 | A1* | 11/2011 | Bansi et al. ..................... 463/23 |
| 2012/0094751 | A1 | 4/2012 | Reynolds et al. |
| 2012/0094755 | A1 | 4/2012 | Reynolds et al. |
| 2012/0094766 | A1 | 4/2012 | Reynolds et al. |

FOREIGN PATENT DOCUMENTS
WO    WO2010093831    *  8/2010

OTHER PUBLICATIONS

Havas Interactive UK Ltd., "Warcraft II, Battle.net Edition", 1999, Blizzard Entertainment, pp. 4-23.*
U.S. Appl. No. 12/904,722, Examiner Interview Summary mailed Feb. 16, 2012, 3 pgs.
U.S. Appl. No. 12/904,722, Final Office Action mailed Apr. 13, 2012, 13 pgs.
U.S. Appl. No. 12/904,722, Non Final Office Action mailed Dec. 27, 2011, 11 pgs.
U.S. Appl. No. 12/904,722, Non Final Office Action Response filed Mar. 22, 2012 response to Non Final Office Action mailed Dec. 27, 2011, 10 pgs.
U.S. Appl. No. 13/244,779, Examiner Interview Summary mailed Mar. 6, 2012, 3 pgs.

(Continued)

*Primary Examiner* — Michael Cuff
(74) *Attorney, Agent, or Firm* — Schwegman, Lundberg & Woessner, P.A.

(57) ABSTRACT

This disclosure generally relates to systems and methods for executing asynchronous game play by a plurality of players in one or more game instances.

20 Claims, 8 Drawing Sheets

OTHER PUBLICATIONS

U.S. Appl. No. 13/244,779, Final Office Action mailed Apr. 13, 2012, 11 pgs.
U.S. Appl. No. 13/244,779, Non Final Office Action mailed Dec. 27, 2011, 11 pgs.
U.S. Appl. No. 13/244,779, Non Final Office Action Response filed Mar. 23, 2012 response to Non Final Office Action mailed Dec. 27, 2012, 9 pgs.
U.S. Appl. No. 13/244,791, Examiner Interview Summary mailed Feb. 27, 2012, 3 pgs.
U.S. Appl. No. 13/244,791, Final Office Action mailed Apr. 16, 2012, 12 pgs.
U.S. Appl. No. 13/244,791, Non Final Office Action mailed Dec. 27, 2011, 12 pgs.
U.S. Appl. No. 13/244,791, Non Final Office Action Response filed Mar. 23, 2012 response to Non Final Office Action mailed Dec. 27, 2012, 9 pgs.
U.S. Appl. No. 13/244,807, Examiner Interview Summary mailed Mar. 1, 2012, 3 pgs.
U.S. Appl. No. 13/244,807, Final Office Action mailed Apr. 16, 2012, 12 pgs.
U.S. Appl. No. 13/244,807, Non Final Office Action mailed Dec. 27, 2011, 12 pgs.
U.S. Appl. No. 13/244,807, Non Final Office Action Response filed Mar. 23, 2012 response to Non Final Office Action mailed Dec. 27, 2011, 13 pgs.

* cited by examiner

ASYNCHRONOUS INTERACTIVE GAME PLAY

CLAIM OF PRIORITY

This application is a continuation of and claims the benefit of priority under 35 U.S.C. §120 to U.S. patent application Ser. No. 12/904,722, filed on Oct. 14, 2010, which is hereby incorporated by reference herein in its entirety.

TECHNICAL FIELD

This disclosure generally relates to games and applications in general and in particular to computer-implemented online games, such as online role-playing games (RPGs), playable by more than one person from more than one location.

BACKGROUND

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DESCRIPTION OF EXAMPLE EMBODIMENTS

Figure 1:
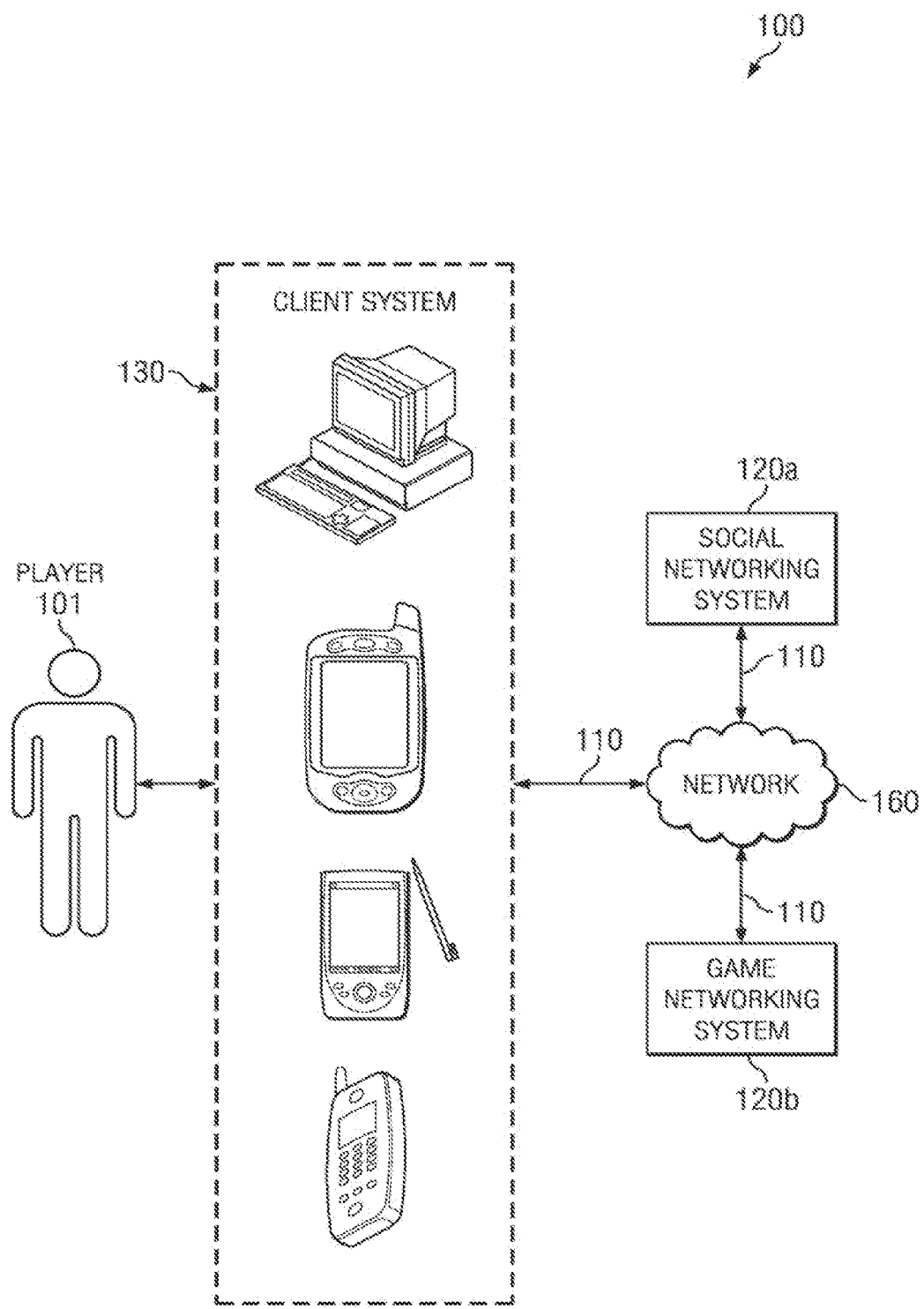
FIG. 1 illustrates an example of a system for implementing particular disclosed embodiments.

FIG. 1 illustrates an example of a system for implementing various disclosed embodiments. In particular embodiments, system 100 comprises player 101, social network system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social network system 120a, game networking system 120b, client system 130, and network 160, this disclosure contemplates any suitable arrangement of player 101, social network system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120a, game networking system 120b, client system 130, and network 160, this disclosure contemplates any suitable connections between player 101, social network system 120a, game networking system 120b, client system 130, and network 160. As an example and not by way of limitation, in particular embodiments, client system 130 may have a direct connection to social network system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides back-end support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Play

In particular embodiments, player 101 can engage in or cause a player character controlled by him to engage in one or more in-game actions. For a particular game, various types of in-game actions may be available to player 101. As an example and not by way of limitation, a player character in an online role-playing game may be able to interact with other player characters, build a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in a online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In particular embodiments, player 101 can perform an in-game action on an in-game object. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock, however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In particular embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed and the player advances to a new game instance. As yet another example and not by way of limitation, player 101 may pick the lock on a virtual door to open it, thereby changing the game state of the door (it goes from closed to open) and causing a game event (the player can access a new area of the game).

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables; such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

Harvest Mechanic

In particular embodiments, an online game can include a series of user-initiated in-game actions that comprise a harvest mechanic. The harvest mechanic generally has two components: a set of initiating actions and a set of collecting actions. In an initiating action, player 101 may "click" or otherwise interact with an in-game object of the online game to initiate the harvest mechanic. In some games, multiple clicks or other actions may be necessary to complete the initiating action. For example, player 101 may have to click on a stove to clean it and click again to prepare ingredients and initiate cooking virtual food. In another example, player 101 may have to click on a parcel of virtual land to plow it and click again to plant seeds and initiate growing virtual crops.

Once the initiating action is complete, the online game may begin a processing action, wherein the game state of the in-game object is modified by the game system during some time period. The time period can range from seconds to days, depending on the online game. For example, the game engine may require an hour for virtual food to get cooked, or it may require three days for a virtual crop to grow. During the processing action, player 101 may be able to cancel the processing action, thereby resetting the entire harvest mechanic sequence. During the processing action, player 101 may also be able to interact with the in-game object. For example, player 101 could add spice to his virtual food while it is cooking, or player 101 could add fertilizer to his virtual crops while they are growing. These interactions may or may not cause a change in game state of the in-game object. In particular embodiments, there is no processing action, and the collecting action is accessible immediately after the initiating action is complete. In other embodiments, the processing action is instantaneous.

After the processing action is complete, the game engine can alter the game state of the in-game object. At this point, the collecting action may be available. In a collecting action, player 101 may click or otherwise interact with the in-game object to complete the harvest mechanic. For example, player 101 may have to click on the fully-cooked virtual food to serve it. In another example, player 101 may have to click on fully-grown crops to harvest them. In some games, multiple clicks or other actions may be necessary to complete the collecting action. In particular embodiments, one or more in-game assets are other game benefits are provided to player 101 for completing the collecting action.

Once the collecting action is complete, the harvest mechanic may be reset with respect to that game in-game object. In some embodiments, player 101 may have to click or otherwise interact with the in-game object to reset the harvest mechanic. In other embodiments, the harvest mechanic may reset automatically once the collecting action is complete. Once the harvest mechanic is reset, the initiating action may be available again for that in-game object.

In particular embodiments, certain game events may cause the harvest mechanic to terminate. As an example and not by way of limitation, if the collecting action is not performed on an in-game object within a certain period of time, the game engine may remove access to the collecting action for that in-game object. This may prevent player 101 from receiving any in-game assets or other game benefits awarded for performing the collecting action on that in-game object. Furthermore, player 101 may then have to perform one or more in-game actions to reset the harvest mechanic with respect to that in-game object. As another example and not by way of limitation, if the collecting action is not performed on virtual crops with a certain period of time, the game engine may cause the crops to wilt, such that the collecting action can no longer be performed on the crops.

In particular embodiments, a harvest mechanic can be performed by a plurality of players 101 of an online game. A plurality of players 101 can perform a plurality of in-game actions on an in-game object during synchronous or asynchronous game play. As an example and not by way of limitation, a first player may click on a parcel of virtual land to plow it at a first time, and a second player may click on the parcel to plant seeds at a later time. In particular embodiments, particular steps of the harvest mechanic may only be performed by specific players. As an example and not by way of limitation, a game instance associated with that first player may include a parcel of virtual land with wilted crops. Because the game instance is associated with the first player, that player may only be able to performing a clearing action on the wilted crops, thereby resetting the harvest mechanic. However, a second player who is not associated with the game instance may be able to access the game instance and perform other in-game actions on the parcel, such as performing a unwither action, which resets the harvest mechanic to the beginning of the collecting action. If the second player performs an unwither action, the first player may then be able to perform a collecting action on the virtual crops.

Social Graphs and Social Networking Systems

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N-1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
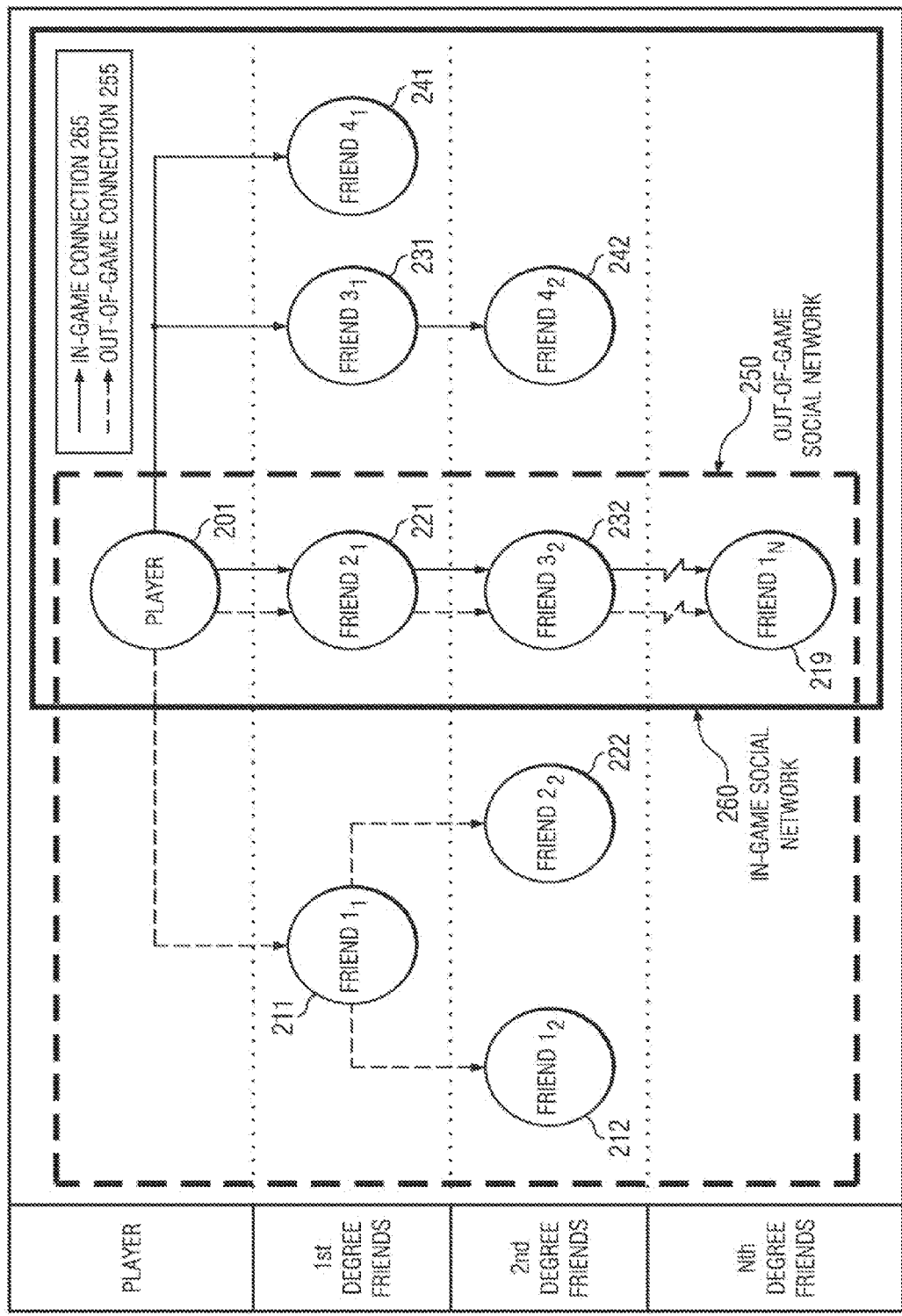
FIG. 2 illustrates an example social network.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Asynchronous Game Play

In multiplayer online games, two or more players can play in the same game instance. Game play is asynchronous when the players do not play simultaneously in the game instance. In particular embodiments, synchronous game play between two players in the same game instance can be simulated from asynchronous game play by recording the game play of a first player in the game instance at a first time and replaying that game play during the game play of a second player in the game instance at a later time.

EXAMPLE METHODS

Figure 3:
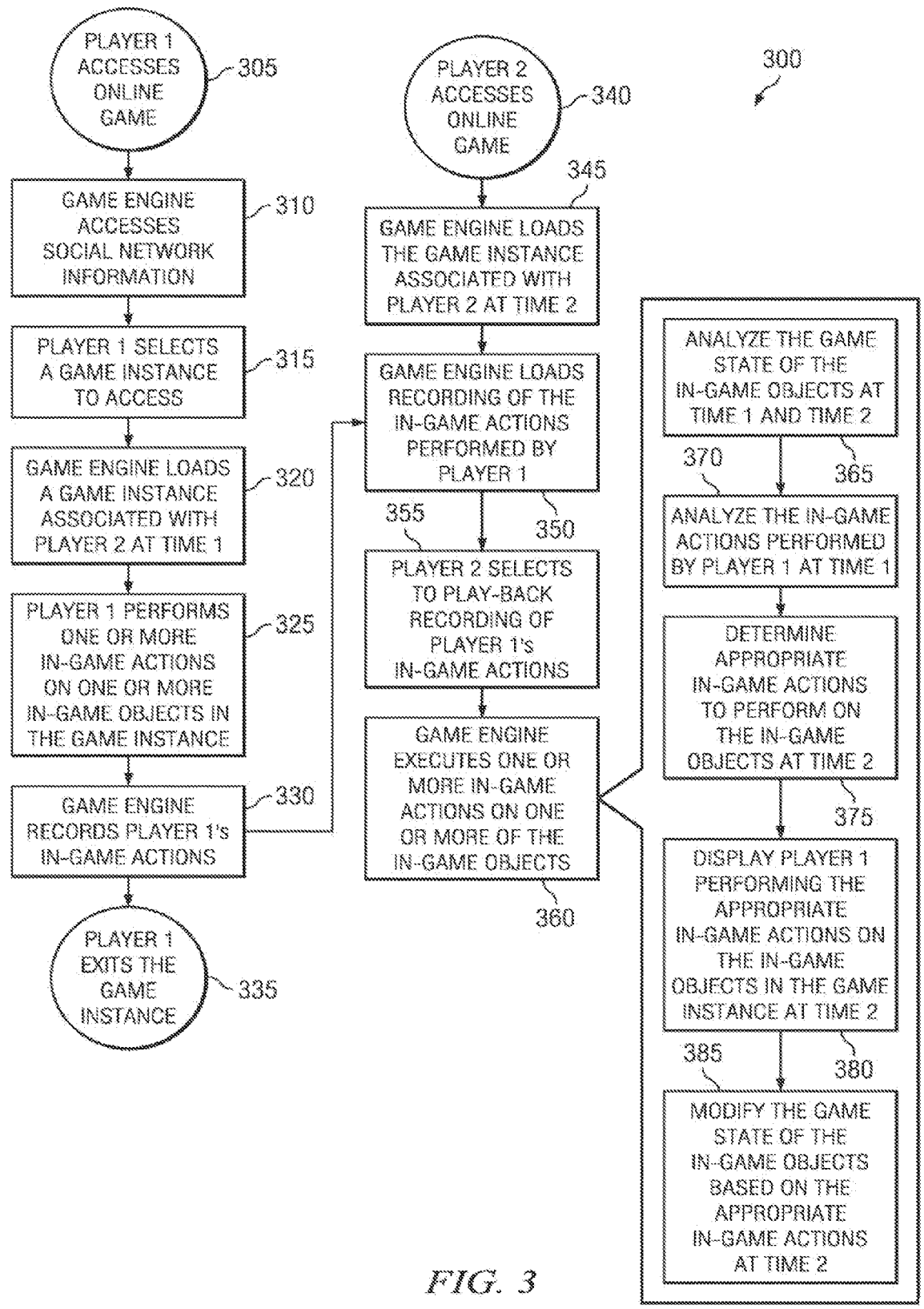
FIG. 3 illustrates an example method for implementing particular disclosed embodiments.

In particular embodiments, the game engine can record the in-game actions of a first player in a game instance for later play-back by other players in the game instance, and then the game engine load and execute the previously recorded in-game actions during the game play of other players in the game instance. FIG. 3 illustrates an example method 300 for implementing particular disclosed embodiments.

At step 305, a first player (Player 1) can access an online game. In particular embodiments, Player 1 can access the online game on game networking system 120b, social networking system 120a, or both. As an example and not by way of limitation, Player 1 may access, via client system 130, a webpage hosted by social networking system 120a, wherein the webpage has an embedded game interface hosted by game networking system 120b.

At step 310, the game engine can access the Player 1's social networking information. In particular embodiments, the game engine can access social networking information on social networking system 120a, game networking system 120b, or both. As an example and not by way of limitation, Player 1 may have an out-of-game social network 250 on social networking system 120a and an in-game social network 260 on game networking system 120b, wherein the in-game social network 260 is a subset of Player 1's first-degree friends in out-of-game social network 250. In other embodiments, the game engine does not access any social networking information, such that method 300 bypasses step 310.

At step 315, Player 1 can select a game instance to access. In particular embodiments, Player 1 can select the game instance from a set of game instances associated with another player of the online game. In particular embodiments, Player 1 can select the game instance from a set of game instances associated with friends in Player 1's social network. Here, Player 1 selects a second player (Player 2), who is a friend in Player 1's social network. In other embodiments, Player 1 can only access game instances associated with first-degree friends in Player 1's in-game social network. In yet other embodiments, Player 1 can access a game instance from a set of predetermined game instances, wherein the game instances may or may not be associated with other players.

At step 320 the game engine can then load the game instance selected by Player 1. Here, the game engine loads the game instance associated with Player 2 at a first time (Time 1). As used herein. "time" may refer a specific time point or a time period of specific duration. In particular embodiments, the game engine automatically loads a game instance and Player 1 does not perform any selection, such that method 300 bypasses steps 310-315. The in-game objects in the game instance have particular game states at Time 1.

At step 325, Player 1 can perform one or more in-game actions on one or more in-game objects in the game instance. In particular embodiments, the game engine can display Player 1's in-game actions and the associated game state changes to Player 1, but any game state changes to in-game objects caused by Player 1's in-game actions may not be stored on game networking system 120*b*. In other embodiments, the game engine can display Player 1's in-game actions and the associated game state changes to Player 1, but any game state changes to in-game objects caused by Player 1's in-game actions may be stored in a new copy of the game instance. In one implementation, the game engine stores an identifier for the in-game objects on which Player 1 has performed actions, such as clicking on an object to advance the progression of a harvest mechanic as to a game object, like a plot of land.

At step 330, the game engine can record each in-game action performed by Player 1. In particular embodiments, the in-game actions are stored in a data store in social networking system 120*a*, game networking system 120*b*, or both. The game engine can also record any game state changes to in-game objects caused by Player 1's in-game actions. This disclosure contemplates any suitable systems for storing in-game actions, game state changes, and other game-related data.

At step 335, Player 1 can then exit the game instance associated with Player 2. Player 1 can then access another game instance (such as, for example, a game instance associated with yet another player in Player 1's in-game social network) or exit the online game. Player 1 is considered inactive once he exits the online game.

At step 340, Player 2 can access the online game. In particular embodiments, Player 2 can access the online game on game networking system 120*b*, social networking system 120*a*, or both. As an example and not by way of limitation, Player 2 may access, via client system 130, a webpage hosted by social networking system 120*a*, wherein the webpage has an embedded game interface hosted by game networking system 120*b*.

At step 345, the game engine can load a game instance for Player 2. Here, the game engine loads the game instance associated With Player 2 at a second time (Time 2), wherein Time 2 is at a later time than Time 1. In particular embodiments, Player 2 selects a game instance to load from a set of game instances, wherein the game instances may or may not be associated with players of the online game. The in-game objects in the game instance have particular game states at Time 2, and these game states may be the same or different as the game states of the in-game objects at Time 1. As an example and not by way of limitation, the game engine may automatically change the game state of specific in-game objects over time, such as, for example, a virtual crop may change game state from growing to fully-grown after a specific period of time. Because the in-game actions that can be performed on specific in-game objects may vary based on the current game state of the in-game object, the set of in-game actions that can be performed on a specific in-game object at Time 1 may vary from the set of in-game action that can be performed at Time 2. In particular embodiments, game state changes associated with Player 1's in-game actions at Time 1 are not yet implemented, in the game instance. As an example and not by way of limitation, if Player 1 harvested a fully-grown crop at Time 1, that crop may appear unharvested to Player 2 when the game instance is loaded at Time 2. As an example and not by way of limitation, if Player 1 harvested a fully-grown crop at Time 1, that crop may appear withered to Player 2 when the game instance is loaded at Time 2. As yet another example and not by way of limitation, if Player 1 shot a virtual bear in the game instance at Time 1, that bear may appear as yet uninjured to Player 2 when the game instance is loaded at Time 2.

At step 350, the game engine can load a recording of one or more in-game actions performed by Player 1. Here, the game engine loads the in-game actions recorded at step 330. In one implementation, the recorded data includes identifiers associated with one or more in-game objects on which Player 1 clicked. In some instances, a given in-game object may be identified more than once in the recorded data. In particular embodiments, the game engine can also load a recording of the game state changes associated with the in-game actions performed by Player 1. In other embodiments, the game engine can load a recording of the game state changes associated with the in-game actions performed by Player 1, but the game engine may not load a recording of the in-game actions. In some embodiments, the game engine can also load and display Player 1's player character. In other embodiments, the game engine can load and display a proxy of Player 1's player character. A proxy is a type of NPC wherein one or more attributes of the proxy are based on a PC. The proxy can be created and controlled by the game engine regardless of whether the player of the PC the proxy is based on is actively using the online game. Still further, other players may have performed similar actions to Player 1 with respect to the game instances of Player 2. This data may have also been recorded and may be presented to Player 2.

At step 355, Player 2 can select whether or not to play-back the recording of Player 1's in-game actions. Here, Player 2 selects to play-back the recording of Player 1's in-game actions. As an example and not by way of limitation, the game engine can load a proxy of Player 1's player character. Player 2 can then mouse over or otherwise interact with the proxy to activate some type of option window. The option window can give Player 2 the option of whether or not to play-back Player 1's recorded in-game actions. If Player 2 chooses to play-back the recording, method 300 can proceed to step 360. Otherwise, method 300 can ignore, delete, or negate Player 1's recorded in-game actions. This disclosure contemplates using any suitable method for selecting to play-back recorded in-game actions. In particular embodiments, Player 2 can perform one or more in-game action prior to selecting whether or not to play-back the recording of Player 1's in-game actions. This may further change the game state of one or more in-game objects at Time 2, which may affect the implementation of other steps in method 300. This disclosure contemplates any suitable sequence for recording and playing back Player 1's in-game actions during the subsequent game play of Player 2.

At step 360, the game engine can execute one or more of Player 1's recorded in-game actions on one or more of the in-game objects in the game instance. Step 360 can include one or more of sub-steps 365 through 385. Step 360 can also include other sub-steps not described herein. This disclosure contemplates any suitable number and type of sub-steps for executing recorded in-game actions by one or more players.

At sub-step 365, the game engine can analyze and compare the game state of the in-game objects at Time 1 and Time 2 (the current game state) to determine, for example, if the game state of any of the in-game objects has changed. By comparing the game states at Time 1 and Time 2, the game engine can determine if and how the game states have changed over time. In particular embodiments, an in-game object in a game instance may have a first game state at Time 1 and a second game state at Time 2. As an example and not by way of limitation, a virtual bear may be injured at Time 1 and have only one hit point, and then the game engine may cause the virtual bear to heal three hit points between Times 1 and 2, bringing it to a total of four hit points at Time 2. In particular embodiments, an in-game object in a game instance that existed at Time 1 may no longer exist at Time 2. As an example and not by way of limitation, a virtual crop on a plot unit of land may exist in a game instance at Time 1, and then a player may access the game instance at a time between Times 1 and 2 and perform a collecting action on the crop, thereby removing it from the game instance. Consequently, when the game instance is accessed at Time 2, the in-game object is no longer present.

At sub-step 370, the game engine can analyze the in-game actions performed by Player 1 at Time 1 to determine, for example, if the in-game actions or the game state changes caused by the in-game actions at Time 1 are compatible with the game states of the in-game objects at Time 2. As an example and not by way of limitation, Player may have performed a collecting action on a virtual crop at Time 1. At Time 2, the game engine may have changed the game state of that virtual-crop from fully-grown to wilted. Because collecting actions, cannot be performed on wilted crops, Player 1's in-game at Time 1 is not compatible with the game state of the in-game object at Time 2.

At sub-step 375, the game engine can determine one or more appropriate in-game actions to perform on the in-game objects. An appropriate in-game action is one that is consistent with the game logic of the online game. In particular embodiments, the game engine can determine an appropriate in-game action based on the game state of the in-game object at Time 2. As an example and not by sway of limitation, if the game of an in-game object is the same at Time 1 and Time 2, the game engine may determine that the in-game action performed by Player 1 on the in-game object at Time 1 is appropriate. However, if the game state of an in-game object is different at Time 1 and Time 2, the game engine may determine that the in-game action performed by Player 1 on that in-game object at Time 1 is no longer appropriate. In the latter ease, the game engine can determine an alternate in-game action to substitute for the in-game action from Time 1. Alternatively, the game, engine can negate or ignore the in-game action from Time 1. As another example and not by way of limitation, a game instance may have a virtual crop. If the virtual crop was still growing processing action) at Time 1, player 1 may fertilize, the crop, at Time 1. At Time 2, the crop may be fully-grown. As such, an appropriate in-game action at Time 2 would be to perform a collecting action on the virtual crop In particular embodiments, the game engine can determine an appropriate in-game action based on the in-game action performed by Player 1 on the in-game object at Time 1. As an example and not by way of limitation, a player may be able to pet or shoot a virtual bear in a game instance. If Player 1 petted a virtual bear at Time 1, though it may still be consistent with game logic to shoot the bear at Time 2, the game engine may determine that the appropriate in-game action at Time 2 is to pet the bear based on Player 1's in-game action at Time 1.

At sub-step 380, the game engine can display Player 1's player character or a proxy of the player character) performing the appropriate in-game actions determined at step 375. If the game engine determined that an in-game action from Time 1 is still appropriate, it can display Player 1 performing that in-game action. If the game engine determined that the in-game action from Time 1 was not appropriate, it can display the alternate in-game action, or possibly display no in-game action at all (for example, if the in-game object no longer exists).

At sub-step 385, the game engine can then modify the game state of the in-game objects-based on the appropriate in-game actions. In particular embodiments, the change in game state may be based on the appropriate in-game action as determined at sub-step 375. In other embodiments, the change in game state may be based on the displayed in-game, action performed by Player 1 (or a proxy) at sub-step 380. By displaying Player 1 performing the appropriate in-game actions at Time 2 rather than the actions Player 1 orginally performed at Time 1, the game engine is able to create the illusion of synchronous game play from asynchronous game play essentially by displaying a modified version Player 1's prior game play.

Although this disclosure describes and illustrates particular steps of the method of FIG. 3 as asynchronous game play between two players, this disclosure contemplates asynchronous game play between any number of players. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure, describes and illustrates particular components carrying out particular steps of the method of FIG. 3, this disclosure contemplates any suitable combination of any suitable components carrying out any suitable steps of the method of FIG. 3. Finally, although this disclosure describes examples of the method of FIG. 3 as involving particular in-game actions; in-game objects, and game states, this disclosure contemplates any suitable in-game actions, in-game objects, and game states.

FRONTIERVILLE EXAMPLE

Figure 4A:
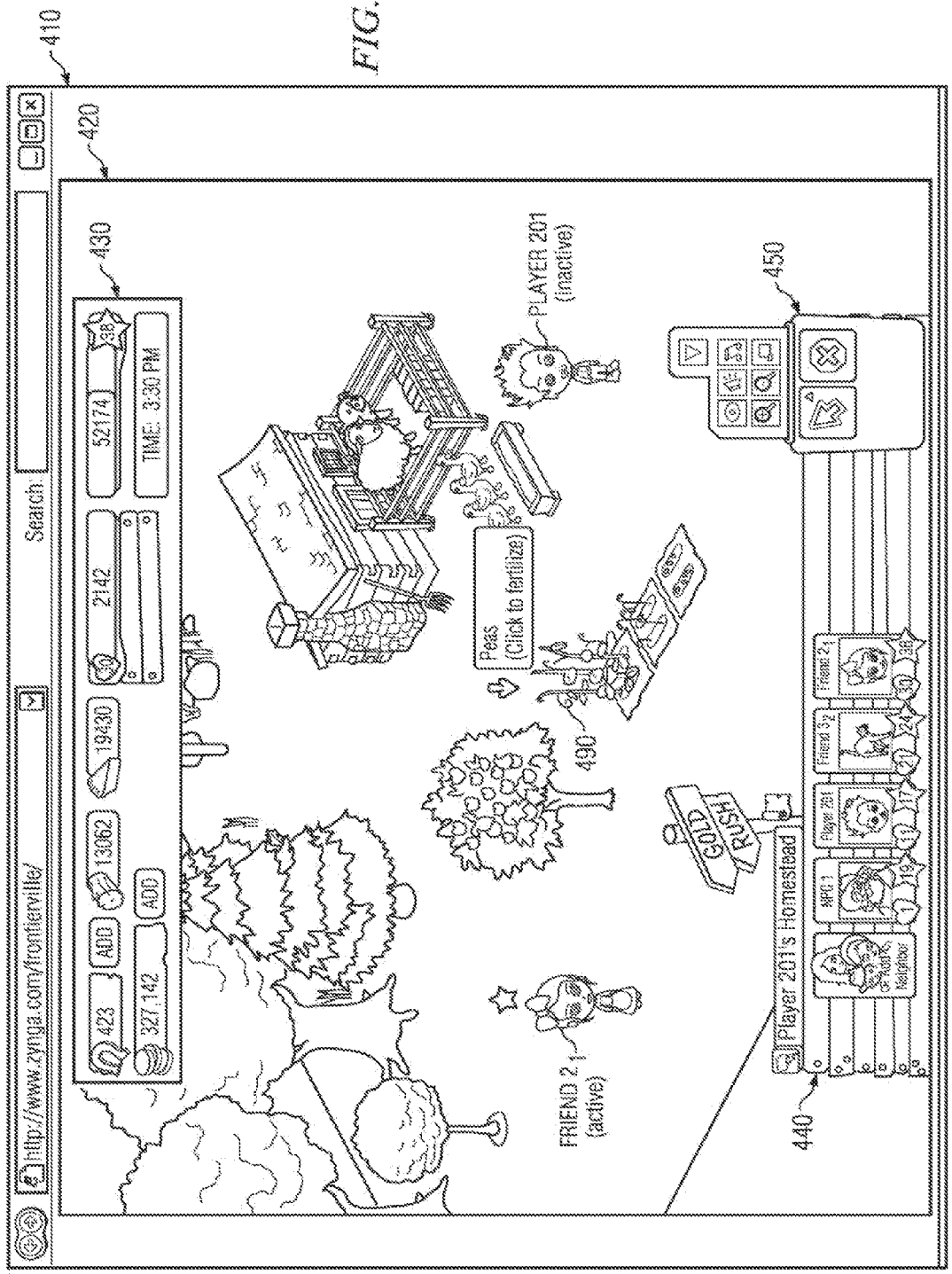
FIG. 4A illustrates an example game instance.
Figure 4B:
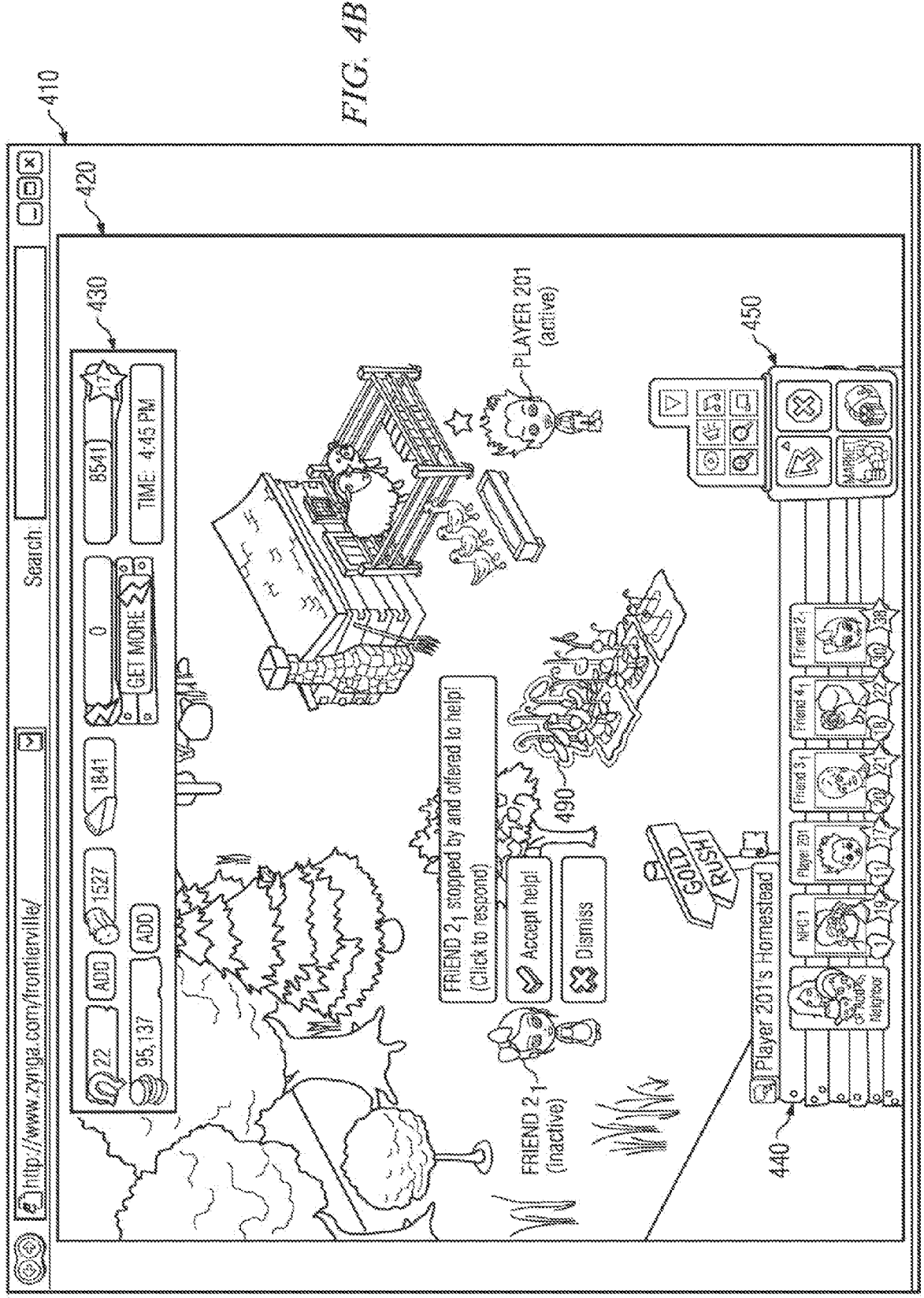
FIG. 4B illustrates an example game instance.
Figure 4C:
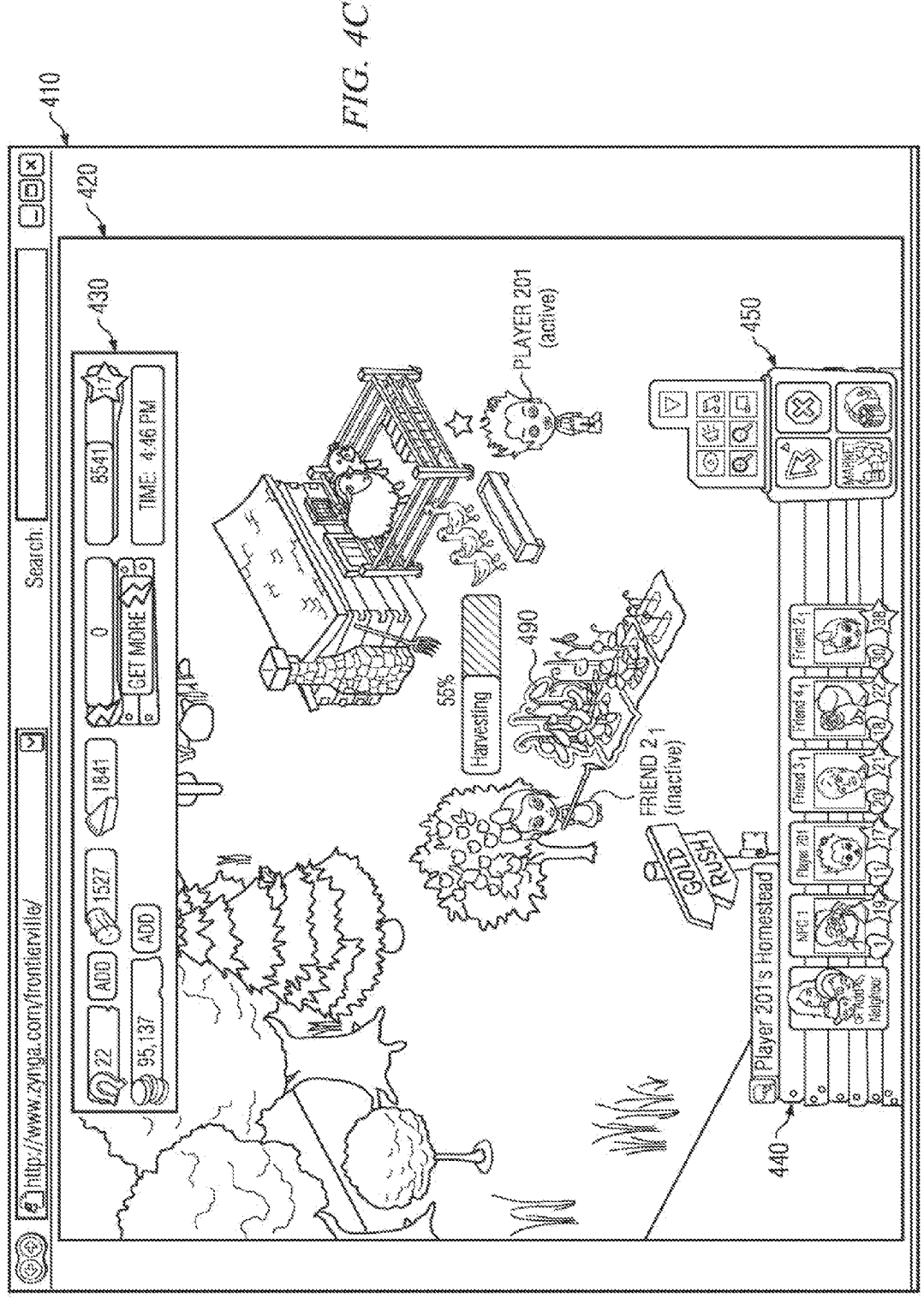
FIG. 4C illustrates an example game instance.

FIGS. 4A, 4B, and 4C illustrate an example embodiment of a game instance in an online role-playing game (RPG). FIGS. 4A-4C illustrate an example of a virtual homestead in Zynga's FrontierVille online game, however this disclosure contemplates any suitable online game. A player of the online RPG can access, the game via a browser client 410, which presents game interface 420. Game interface 420 shows Player 201's player character on "Player 201's Homestead," which is a game instance associated with Player 201. Game interface 420 also shows Friend 2$_1$'s player character on the homestead. For purposes of illustration, FIGS. 4A-4C refer to users of the social networks illustrated in FIG. 2. Although this disclosure describes and illustrates in FIGS. 4A-4C the game play of particular players in a particular game instance in a particular online game, this disclosure contemplates game play by any suitable players in any suitable game instance in any suitable online game. Moreover, although this disclosure describes and illustrates in FIGS. 4A-4C the game play of players in a particular social network, this disclosure contemplates game play by any suitable players regardless of whether the player is a user of a particular social network. Game interface 420 displays player character state information of the active player in box 430. Game interface 420 also displays all the first-degree friends from the active player's in-game social network (such as, for example, in-game social network 260) in box 440. The first-degree friends in box 440 are players of the online game who have formed an explicit in-game connection (such as, for example, in-game connection 265) with the active player. For example, FIG. 4A shows Friend 2$_1$'s first-degree, friends are Friend 3$_2$, Player 201, and NPC 1, wherein NPC 1 is a non-player character controlled by the game engine. As another example, FIGS. 4B and 4C show Player 101's first-degree friends are Friend 2$_1$, Friend $3_1$, Friend $4_1$, and NPC 1. Game interface 420 also displays a menu for selection a variety of in-game actions in box 450.

In particular embodiments, a player controls a player character on a virtual homestead in the online RPG. The player (via his player character) can build and maintain the virtual homestead. The player can engage in a variety of in-game actions on the virtual homestead. For example, the player can plants seeds, which grow into crops, which can be harvested to earn in-game assets. Building, animals, trees, and other in-game objects can also be purchased and various in-game actions can be performed on these in-game objects.

Particular in-game objects can be interacted, with using the harvest mechanic described previously. As an example and not by way of limitation, various virtual crops can be planted, grown, and harvested using a series of user-initiated in-game actions comprising a harvest mechanic. To grow crops, a player must first select a type of crop to plant (e.g., cotton, wheat, etc.). Each type of crop has a cost in virtual currency and a time necessary for it to grow into a harvestable crop. For example, wheat has a 24 hour growth time and costs 365 virtual coins. The player can then click on a plot of land, and his player character will move to the plot of land and plant the crop, thereby completing the initiating action. The player's game account is also debited by the amount of virtual coins needed to buy the crop. Once the crops are planted, the processing action begins, and the game engine indicates that the crops are growing. By clicking on the growing crops, the player can view how much time is remaining in the processing action. Once the growth time has elapsed, the processing action will end and the game engine will modify the crops into fully-grown harvestable crops. The player can then perform a collecting action by clicking on the crops to harvest them and sell them for virtual coins. For example, wheat yields 587 virtual coins per plot. Crops disappear after being harvested. This completes the collecting action. If the crop is not harvested within a specific time, it will wilt and must be plowed and replanted, unless the unwither action is performed on the withered crops. For example, wheat will grow in 24 hours if the wheat is not harvested within 24 after the crop are fully-grown, it will wither and die, and the player will not be able to harvest it for virtual coins, unless the unwither action is performed on the crop. To gain access to the unwither action, the player may spend legal or virtual currency to buy one or more uses of the unwither action. Alternatively, first-degree friend's, can visit the player's homestead and perform the unwither action.

FIG. 4A illustrates the game play of a first player (Friend $2_1$) in a specific game instance at a first time. Friend $2_1$ can access the online RPG on game networking system 120b, via a suitable browser client on client system 130. Friend $2_1$ can provide user-inputs via game interface 420. Typically, when a player accesses the online RPG, the game engine automatically loads a game instance associated with that player. From there, the player can choose to access other game instances, such as, for example, game instances associated with first-degree friends in their in-game social network. FIG. 4A illustrates Friend $2_1$ accessing a game instance associated with a second player (Player 201), which is called "Player 201's Homestead." Friend $2_1$'s player character state is displayed in box 430 and her first-degree in-game friends are displayed in box 440. Box 430 also displays a game clock, which shows a time of "3:30 PM." FIG. 4A also illustrates Friend $2_1$'s player character as active and Player 201's player character as inactive. From here, Friend $2_1$ can perform one or more in-game actions on one or more in-game objects in Player 201's Homestead. For example, by clicking on virtual peas 490, Friend $2_1$ will cause her player character to move over to virtual peas 490 and perform a fertilizing action. In FIG. 4A, virtual peas 490 are growing, and currently in a processing action. By performing a fertilizing action, Friend $2_1$ may cause the game state of the virtual peas 490 to change. The game engine will record Friend $2_1$'s fertilizing action on virtual peas 490, and this is stored on game networking system 120b, however, any game state changes caused by Friend $2_1$'s in-game actions will not be recorded.

FIGS. 4B and 4C illustrate the game play of Player 201 in the same game-instance at a later time. Player 201 can access the online RPG on a game networking system 120b via a suitable browser client on client system 130. Player 201 can provide user-inputs via game interface 420. When Player 201 accesses the online RPG, the game engine automatically loads the game instance associated with Player 201, here "Player 201's Homestead." Player 201's player character state is displayed in box. 430 and his first-degree in-game friends are displayed in box 440. Box 430 also displays a game clock, which shows a time of "3:45 PM" in FIG. 4B and "3:46 PM" in FIG. 4C. Here, Player 201's game play as illustrated in FIGS. 4B and 4C also occurring at a later time than Friend $2_1$'s game play described above. FIGS. 4B and 4C also illustrate Friend $2_1$'s player character as inactive and Player 201's player character, as active.

FIG. 4B illustrates the loading and selecting of recorded in-game actions in the game, instance associated with Player 201, Next to Friend $2_1$'s player character is an option box, which informs Player 201 that Friend $2_1$ previously accessed Player 201's. Homestead and performed one or more in-game actions therein. The option box also gives Player 201 the choice to either "Accept Help!" or to "Dismiss." The game engine will also highlight any in-game actions that Friend $2_1$ performed in-game actions on. Here, virtual peas 490 are highlighted in FIG. 4B because Friend $2_1$ fertilized the peas in FIG. 4A. Note that virtual peas 490 have become fully-grown in FIG. 4B. Between Friend $2_1$'s game play in FIG. 4A and Player 201's game play in FIG. 4B, the game engine has completed the processing action on virtual peas 490 and has changed its game state appropriately, from growing to fully-grown. If Player 201 clicks on "Accept Help!", the game engine, will play-back Friend $2_1$'s in-game actions as illustrated in FIG. 4A. If Player 201 clicks on "Dismiss," then Friend $2_1$'s player character will disappear, Friend $2_1$'s in-game actions as illustrated in FIG. 4A will not be played back, and any game state changes associated with those in-game actions will not be implemented. Here, Player 201 clicks on "Accept Help!" in. FIG. 4B.

Once Player 201 initiated play-back by clicking "Accept Help!", the game engine can execute play-back by performing a variety of steps. The game engine can analyze the game state of the relevant in-game objects at the relevant times, analyze any relevant in-game actions performed on those in-game objects, and determine the appropriate in-game actions to perform on the in-game objects during play-back. At the earlier time illustrated in FIG. A, the virtual peas 490 were still in a processing action (i.e., it was growing). In FIGS. 4B and 4C, the processing action on the virtual peas 490 is complete (i.e., it is fully-grown) and is now ready for a player to perform a collecting action to harvest them. Consequently, the game state of virtual peas 490 has changed since Friend $2_1$ performed her in-game action (fertilizing) on them. The game engine can analyze the change in game state and determine an appropriate in-game action to perform on virtual peas 490. Because virtual peas 490 are now fully-grown, fertilizing virtual peas 490 is not consistent with the game logic of the online RPG and is therefore no longer an appropriate action. However, harvesting virtual peas 490 is consistent with the game logic and therefore appropriate. As such, based on the current game state of virtual peas 490, the game engine can determine that the appropriate action to have Friend $2_1$'s player character perform during play-back is a harvesting action, not a fertilizing action.

FIG. 4C illustrates the execution of appropriate in-game actions by Friend $2_1$'s player character in the game instance associated with Player 201. After clicking on "Accept Help!", Friend $2_1$'s player character moves over to virtual peas 490 and begins harvesting them performing a collecting action. Here, even though Friend $2_1$ is inactive, Friend $2_1$'s player character is being controlled by the game engine and is able to perform in-game actions. The game engine will cause the game state of virtual peas 490 to change in response to the appropriate in-game action being performed by Friend $2_1$'s player character. In this case, harvesting virtual peas 490 causes the virtual peas to disappear. It also causes Player 201 to receive certain in-game assets. These game state changes are recorded by the game engine on game networking system 120*b*.

Note that if the game state of virtual peas 490 had not changes between the time of Friend $2_1$'s game play in FIG. 4A and Player 201's game play in FIG. 4B, the game engine would have determined that fertilizing virtual peas 490 was still an appropriate in-game action. Therefore, Friend $2_1$ would have performed the same-in-game action during play-back at a later time.

Although this disclosure describes and illustrates asynchronous game-play between two players in FIGS. 4A-4C, this disclosure contemplates asynchronous game-play between any number of players. Moreover, although this disclosure describes and illustrates particular game play in FIGS. 4A-4C as occurring in a particular order, this disclosure contemplates any suitable game play occurring in any suitable order. Furthermore, although this disclosure describes and illustrates particular components carrying out particular game play in FIGS. 4A-4C, this disclosure contemplates any suitable combination of any suitable components carrying out any suitable game play.

Data Flow

Figure 5:
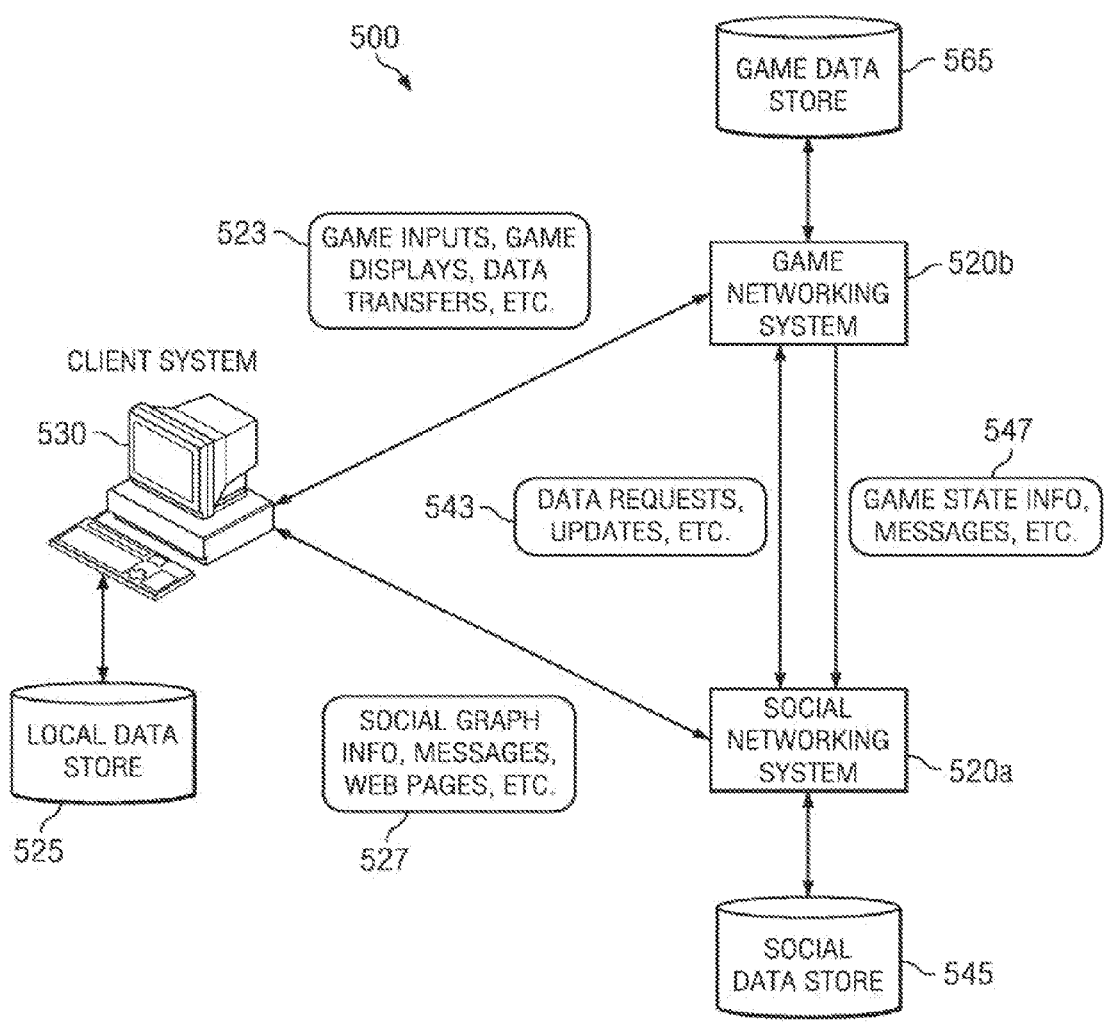
FIG. 5 illustrates an example data flow in a system.

FIG. 5, illustrates an example data flow between the components of the system 500. In particular embodiments, system 500 can include client system 530, social networking system 520*a*, and game networking system 520*b*. The components of system 500 can be connected to each other in any suitable configuration, using any suitable type of connection. The components may be connected directly or over any suitable network. Client system 530, social, networking system 520*a*, and game networking system 520*b* can each have one or more corresponding data stores such as local data store 535, social data store 545, and game data store 565, respectively. Social networking system 520*a* and game networking system 520*b* can also have one or more servers that can communicate with client system 530 over an appropriate network. Social networking system 520*a* and game networking system 520*b* can have, for example, one or more internet servers for communicating with client system 530 via the Internet. Similarly, social networking system 520*a* and game networking system 520*b* can have one or more mobile servers for communicating with client system 530 via a mobile network GSM, PCS, Wi-Fi, WPAN, etc.). In some embodiments, one server may be able to communicate with client system 530 over both the Internet and a mobile network. In other embodiments, separate servers can be used.

Client system 530 Can receive and transmit data 523 to and from game networking system 520*b*. This data can include, for example, webpages, messages, game inputs, game displays, HTTP packets, data requests, transaction information, updates, and other suitable data. At some other time, or at the same time, game networking system 520*b* can communicate data 543, 547 (e.g., game state information, game system account information, page info, messages, data requests, updates, etc.) with other networking systems, such as social networking system 520*a* (e.g., Facebook, Myspace, etc.). Client system 530 can also receive and transmit data 527 to and from social networking system 520*a*. This data can include, for example, webpages, messages; social graph information, social network displays, HTTP packets, data requests; transaction information, updates, and other suitable data.

Communication between client system 530, social networking system 520*a*, and game networking system 520*b* can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In, particular embodiments, a client request may cause a server to respond with a first data object, such as an HTML page, which itself refers to other data objects. A client application, such as a browser, will request these additional data objects as it parses or otherwise processes the first data object.

In particular embodiment's; an instance of an online game can be stored as a set of game state parameters that characterize the state of various in-game objects, such as, for example, player character state parameters, non-player character parameters, and virtual item parameters in particular embodiments, game state is maintained in a database as a serialized, unstructured string of text data as a so-called Binary Large Object (BLOB). When a player accesses an online game on game networking system 520*b*, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520*b*. Game networking system 520b may itself operate by retrieving a copy of the BLOB from a database or an intermediate memory, cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players, playing the same game at the same time may be very large. As the game progresses with each player, multiple players may provide different inputs to the online game at their respective client systems 530, and multiple client systems 530 may transmit multiple player inputs and/or game events, to game, networking system 520b for further processing. In addition, multiple client systems 530 may transmit other types of application data to game networking system 520b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 520a or game networking system 520b), where an instance of the online game is executed remotely on a client system 530, which then transmits application event data to the hosting system such that the remote game server synchronizes game state associated with the instance executed by the client system 530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 520a or game networking system 520b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 520b. However, to expedite the processing and hence the speed of the overall gaming experience, the Flash client may collect a batch of some number of events or updates into a batch file. The number of events or updates may be determined by the Flash client dynamically or determined by game networking system 520b based on server loads or other factors. For example, client system 530 may send a batch file to game networking system 520b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 520b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 520b may retrieve the corresponding BLOB from the database to determine the most-recent values of the game-related data. In particular embodiments, while a player is playing the online game, game networking system 520b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 6:
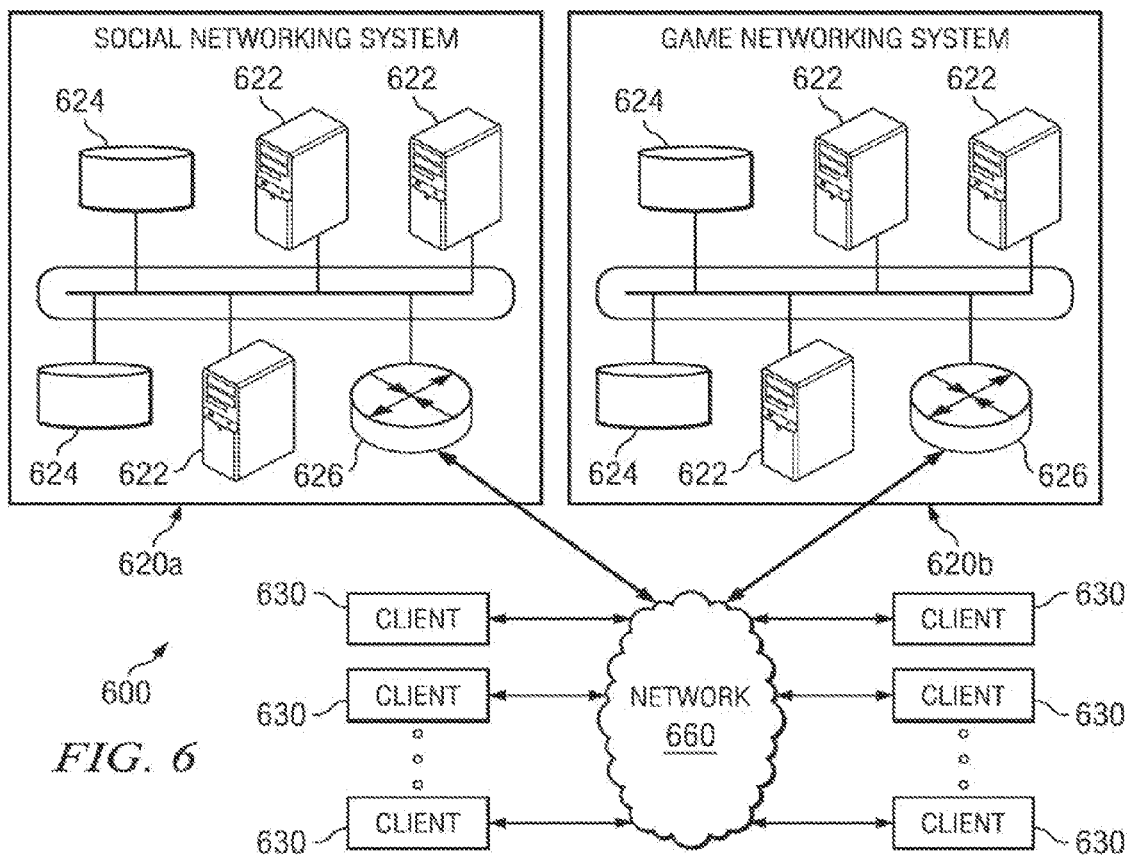
FIG. 6 illustrates an example network environment.

Particular embodiments may operate in a wide area network environment, such as the Internet, including multiple network addressable systems. FIG. 6 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter they may be referred to simply at networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 6 described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 7:
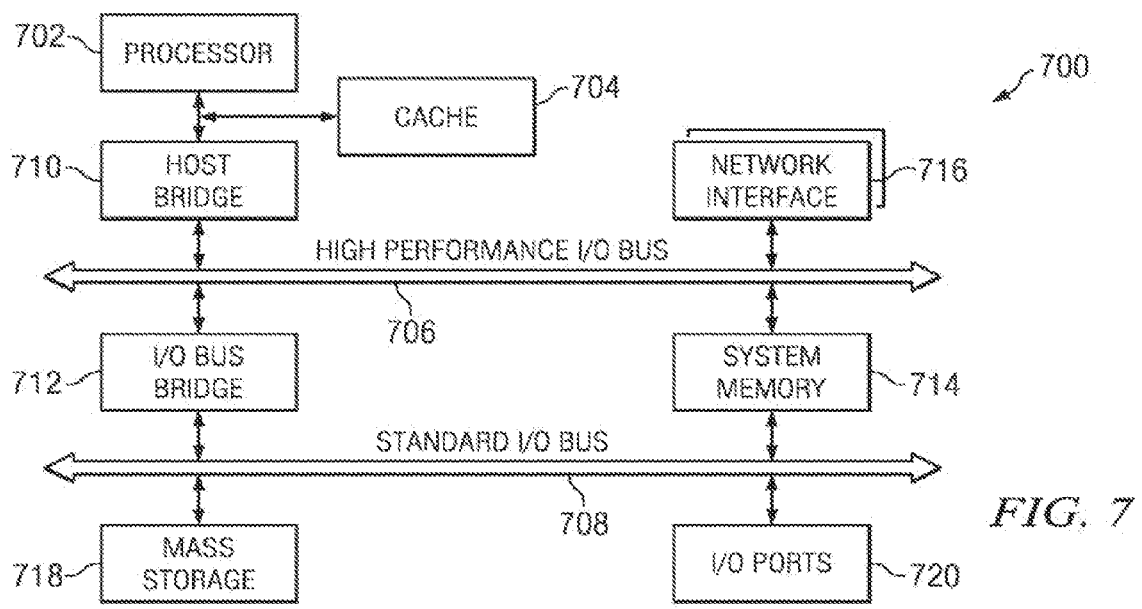
FIG. 7 illustrates an example computer system architecture.

FIG. 7 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may Further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 422, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A computer-implemented method comprising:
    enabling a first player to perform one or more first in-game actions on one or more in-game objects in a game instance of a computer-implemented game of a second player at a first time while the first player is active in the game instance at the first time and the second player is inactive in the game instance at the first time, the one or more in-game objects comprising virtual crops of a virtual farm associated with the second player;
    determining, using at least one processor of a machine, one or more second in-game actions to apply to one or more of the in-game objects in the game instance based on the one or more first in-game actions by the first player at a second time succeeding the first time, and a game state of the game instance at the second time, the one or more second in-game actions being consistent with the game state of the game instance at the second time;
    generating to the second player a request to accept help from the first player;
    playing back the one or more second in-game actions in response to receiving from the second player a confirmation to accept help from the first player; and
    dismissing the one or more second in-game actions in response to receiving from the second player a dismissal to accept help from the first player.

2. The computer-implemented method of claim 1, wherein the first player is active in the game instance of the computer-implemented game of the second player at the first time, wherein the second player is inactive in the game instance of the computer-implemented game of the second player at the first time and active in the game instance of the computer-implemented game of the second player at the second time.

3. The computer-implemented method of claim 1, further comprising:
    determining changes in the one or more of in-game objects in the game instance of the computer-implemented game of the second player between the first time and the second time.

4. The computer-implemented method of claim 3, further comprising:
    filtering out one or more of the first in-game actions by the first player by determining whether the one or more first in-game actions can be applied to one or more of the in-game objects in the game instance at the second time according to a game logic of the computer-implemented game.

5. The computer-implemented method of claim 4, further comprising:
    verifying that the one or more second in-game actions can be applied to one or more of the in-game objects in the game instance at the second time according to the game logic.

6. The computer-implemented method of claim 1, further comprising:
    determining a game state of the one or more in-game objects at the second time; and
    determining the one or more second in-game actions based on the game state of the one or more in-game objects at the second time.

7. The computer-implemented method of claim 1, further comprising:
    responsive to an in-game action by the second player, applying one or more second in-game actions to one or more of the in-game objects in the game instance at the second time.

8. The computer-implemented method of claim 1, further comprising:
    recording the one or more first in-game actions by the first player on the one or more in-game objects in the game instance at the first time.

9. The computer-implemented method of claim 8, further comprising:
    responsive to an in-game action by the second player, displaying the recorded one or more first in-game actions by the first player on the one or more in-game objects in the game instance at the first time.

10. The computer-implemented method of claim 1, further comprising:
    responsive to the one or more first in-game actions by the first player on the one or more in-game objects in the game instance at the first time, displaying to the first player one or more first changes in game state of one or more of the in-game objects; and
    responsive to applying the one or more second in-game actions to one or more of the in-game objects in the game instance at the second time, displaying to the second player one or more second changes in game state of one or more of the in-game objects.

11. The computer-implemented method of claim 10, wherein:
    one or more of the first in-game actions by the first player on one or more of the in-game objects in the game instance at the first time cause one or more first changes in game state of one or more of the in-game objects; and
    applying the second in-game actions to one or more of the in-game objects in the game instance at the second time causes one or more second changes in game state of one or more of the in-game objects.

12. The computer-implemented method of claim 1, wherein the first player and the second player are first-degree friends in a social network.

13. A system comprising:
    at least one processor of a machine; and
    a game networking system configured to:
        enable a first player to perform one or more first in-game actions on one or more in-game objects in a game instance of a computer-implemented game of a second player at a first time while the first player is active in the game instance at the first time and the second player is inactive in the game instance at the first time, the one or more in-game objects comprising virtual crops of a virtual farm associated with the second player;
        determine one or more second in-game actions to apply to one or more of the in-game objects in the game instance based on the one or more first in-game actions by the first player and a game state of the game instance at a second time succeeding the first time, the one or more second in-game actions being consistent with the state of the game instance at the second time;
        generate to the second player a request to accept help from the first player;

play back the one or more second in-game actions in response to receiving from the second player a confirmation to accept help from the first player; and dismiss the one or more second in-game actions in response to receiving from the second player a dismissal to accept from the first player.

14. The system of claim 13, wherein the first player in active in the game instance of the computer-implemented game of the second player at the first time, wherein the second player is inactive in the game instance of the computer-implemented game of the second player at the first time and active in the game instance of the computer-implemented game of the second player at the second time.

15. The system of claim 13, wherein the game networking system is further configured to:

determine changes in the one or more of in-game objects in the game instance of the computer-implemented game of the second player between the first time and the second time.

16. The system of claim 15, wherein the game networking system is further configured to:

filter out one or more of the first in-game actions by the first player by determining whether the one or more first in-game actions can be applied to one or more of the in-game objects in the game instance at the second time according to a game logic of the computer-implemented game.

17. The system of claim 16, wherein the game networking system is further configured to:

verify that the one or more second in-game actions can be applied to one or more of the in-game objects in the game instance at the second time according to the game logic.

18. The system of claim 13, wherein the game networking system is further configured to:

determine a game state of the one or more in-game objects at the second time; and determine the one or more second in-game actions based on the game state of the one or more in-game objects at the second time, 19. The system of claim 13, wherein the game networking system is further configured to:

responsive to an in-game action by the second player, apply one or more second in-game actions to one or more of the in-game objects in the game instance at the second time.

20. A non-transitory machine readable medium storing instructions that, when executed by at least one processor of a machine, causes the machine to perform operations comprising:

enabling a first player to perform one or more first in-game actions on one or more in-game objects in a game instance of a computer-implemented game of a second player at a first time while the first player is active in the game instance at the first time and the second player is inactive in the game instance at the first time, the one or more in-game objects comprising virtual crops of a virtual farm associated with the second player;

determining, using at least one processor of a machine, one or more second in-game actions to apply to one or more of the in-game objects in the game instance based on the one or more first in-game actions by the first player at a second time succeeding the first time, and a game state of the game instance at the second time, the one or more second in-game actions being consistent with the game state of the game instance at the second time;

generating to the second player a request to accept help from the first player;

playing back the one or more second in-game actions in response to receiving from the second player a confirmation to accept help from the first player; and dismissing the one or more second in-game actions in response to receiving from the second player a dismissal to accept help from the first player.

* * * * *

UNITED STATES PATENT AND TRADEMARK OFFICE
CERTIFICATE OF CORRECTION

| | |
|---|---|
| PATENT NO. | : 8,292,713 B2 |
| APPLICATION NO. | : 13/244798 |
| DATED | : October 23, 2012 |
| INVENTOR(S) | : Reynolds et al. |

Page 1 of 1

It is certified that error appears in the above-identified patent and that said Letters Patent is hereby corrected as shown below:

In the Claims

In column 27, line 6, in Claim 13, delete "accept from" and insert --accept help from--, therefor In column 28, line 2, in Claim 18, after "the", delete "¶", therefor In column 28, line 3, in Claim 18, delete "time," and insert --time.--, therefor Signed and Sealed this
Eighteenth Day of November, 2014

Michelle K. Lee
*Deputy Director of the United States Patent and Trademark Office*